(12) United States Patent
Zhou et al.

(10) Patent No.: US 9,470,824 B2
(45) Date of Patent: Oct. 18, 2016

(54) MANUFACTURE METHOD FOR BLAZED CONCAVE GRATING

(71) Applicant: Graduate School at Shenzhen, Tsinghua University, Shenzhen (CN)

(72) Inventors: Qian Zhou, Shenzhen (CN); Kai Ni, Shenzhen (CN); Rui Tian, Shenzhen (CN); Yang Li, Shenzhen (CN); Mingfei Xu, Shenzhen (CN); Jinchao Zhang, Shenzhen (CN); Jinchao Pang, Shenzhen (CN); Hao Dong, Shenzhen (CN)

(73) Assignee: Graduate School at Shenzhen, Tsinghua University, Shenzhen (CN)

( * ) Notice: Subject to any disclaimer, the term of this patent is extended or adjusted under 35 U.S.C. 154(b) by 0 days.

(21) Appl. No.: 14/983,334

(22) Filed: Dec. 29, 2015

(65) Prior Publication Data

US 2016/0131807 A1 May 12, 2016

Related U.S. Application Data

(63) Continuation of application No. PCT/CN2013/087439, filed on Nov. 19, 2013.

(30) Foreign Application Priority Data

Sep. 29, 2013 (CN) .......................... 2013 1 0462037

(51) Int. Cl.
*B29D 11/00* (2006.01)
*G02B 5/18* (2006.01)

(52) U.S. Cl.
CPC .......... *G02B 5/1857* (2013.01); *G02B 5/1847* (2013.01); *G02B 5/1861* (2013.01)

(58) Field of Classification Search
CPC .......................... G02B 5/1857; G02B 5/1847
USPC .......................................................... 216/24
See application file for complete search history.

(56) References Cited

U.S. PATENT DOCUMENTS

2012/0156967 A1   6/2012   Sukegawa et al.

FOREIGN PATENT DOCUMENTS

| CN | 101126825 | 2/2008 |
|---|---|---|
| CN | 101246229 | 8/2008 |
| CN | 103105638 | 5/2013 |
| JP | H0882551 | 3/1996 |
| JP | 2012141647 | 7/2012 |

OTHER PUBLICATIONS

International Search Report of PCT/CN2013/087439 and its English translation, dated Jul. 3, 2014 (4 pages).

*Primary Examiner* — Roberts Culbert

(74) *Attorney, Agent, or Firm* — Hamre, Schumann, Mueller & Larson, P.C.

(57) ABSTRACT

A manufacture method for a blazed concave grating is provided, including: replicating a blazed concave grating by means of a replication process, after the replication is completed, conducting heat preservation and cooling, then separating two gratings (G1, G2) by using different pulling manners respectively, and finally splicing the replicated and separated concave grating blanks, to obtain a required blazed concave grating. This manufacture method can solve the problem of a big error in an existing replication method for a blazed concave grating.

7 Claims, 2 Drawing Sheets though a holographic concave grating integrates dispersion, focusing, and a flat field, it is difficult to directly etch a concave grating by using ion beams because of the restriction of a geometric shape of a concave substrate. Consequently, a groove profile of the concave grating cannot be precisely controlled.

MANUFACTURE METHOD FOR BLAZED CONCAVE GRATING

BACKGROUND OF THE INVENTION

1. Field of the Invention

The present application relates to a novel manufacture method for a blazed concave grating, which can be widely applied to the fields such as optical spectrum instruments, and analysis and measurement, and belongs to the technical field of grating manufacture.

2. Related Arts

A holographic concave grating, which integrates dispersion, focusing and a flat field (where an important characteristic of the concave grating is imaging, and it is capable of imaging in a plane, and therefore, a CCD can be used as a receiving device), is a key element in a portable grating optical spectrum instrument and directly decides the final quality of the optical spectrum instrument. Due to the restriction of a geometric shape of a concave substrate, it is difficult, even impossible in many cases, to directly etch a concave grating by using ion beams. Consequently, a groove profile of the concave grating cannot be precisely controlled, and it has been difficult to improve the diffraction efficiency, leading to an application bottleneck of the concave grating.

For this problem, a common method at present is to directly manufacture a convex master grating by means of exposure and then obtain a concave grating by means of replication. Because flat-field concave gratings have uniform groove profiles, after being replicated by using the convex master grating, a flat-field concave grating only needs to be pulled along the vertical direction, to obtain a required concave gating. However, due to a blazed angle, if a blazed concave grating is also pulled along the vertical direction, the diffraction efficiency of the grating is greatly affected, and the application of the grating is limited.

SUMMARY OF THE INVENTION

In order to overcome the deficiency of an existing replication method, the present application provides a manufacture method for a blazed concave grating, which solves the problem of a big error in the existing replication method for a blazed concave grating.

Therefore, an original whole replication grating blank is divided into two blocks that are completely identical in size and shape, and after replication, the two blocks are separately pulled. Finally, the two blocks are spliced to obtain a required concave grating.

Preferably, the present application also has the following features:

In step A, a convex blazed master grating is formed by conducting sensitization, developing and ion beam etching on a convex blazed master grating substrate, where a working surface of the convex blazed master grating substrate is an optical surface and has been polished; in a preparation process, a working surface of the convex blazed master grating substrate is coated with a photosensitive material, namely, photoresist, in a rotating manner; the convex blazed master grating substrate is first subjected to holographic exposure, to obtain a convex photoresist mask grating, then developing is conducted on the convex photoresist mask grating to obtain a photoresist master grating, and finally ion beam etching is conducted on the developed photoresist master grating to obtain the convex blazed master grating.

A functional surface of the convex blazed master grating substrate is a plane, a spherical surface or an aspheric surface.

In step B, a surface type of the concave grating substrate is consistent with that of the working surface of the convex blazed master grating substrate, and the concave grating substrate can be divided into two blocks having an identical size and shape; a material of a segmentation sheet is a hard high-temperature steaming PE sealing film, of which a main component is polyethylene.

The segmentation sheet cannot be bonded to a silicone oil coating separation layer, a reflection coating, or an epoxy resin glue.

In step C, first, the segmentation sheet is vertically placed in the middle of the convex blazed master grating, the prepared convex blazed master grating is first plated with a layer of a thin and uniform silicone oil coating that serves as a separation layer, and then plated with a reflection coating; then, the convex blazed master grating after evaporation is placed on a platform in a drying oven, epoxy resin is poured onto the convex blazed master grating, and the concave grating substrate is pressed thereon; after leveling and bubble removal, the drying oven is heated to a suitable curing temperature, and after the epoxy resin is cured, the master grating is taken out from the drying oven.

In step E, two gratings have a spacing of B=0 in the vertical direction, and the two gratings have a spacing of S=Nd in the horizontal direction, that is, S is an integer multiple of a grating constant, where N is a positive integer, and d is a grating constant of a grating to be spliced.

The manufacture method for a blazed concave grating of the present application may avoid impact on the diffraction efficiency of a grating caused by pulling, thereby solving the problem of a big error in the existing replication method for a blazed concave grating.

1: convex blazed grating, 2: concave grating substrate, 3: separation layer, reflection coating, and epoxy resin glue;

4: segmentation sheet, G1: first grating for splicing, G2: second grating for splicing, L1: first light ray, L2: second light ray.

DETAILED DESCRIPTION OF THE INVENTION

The present application is further described below with reference to the accompanying drawings and embodiments, so that the technological concept to be protected by the present application can be more clearly understood.

Figure 1:
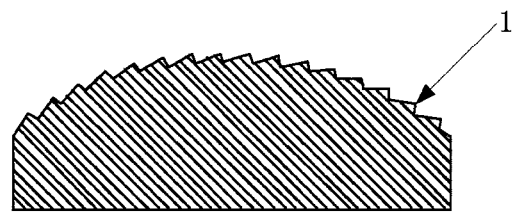
FIG. 1 is a schematic diagram of a prepared convex blazed master grating.

A manufacture method for a blazed concave grating is described in this embodiment, which is specifically as follows:

1. First, a convex blazed master grating 1 is prepared. The prepared convex blazed master grating 1 is as shown in FIG. 1. The convex blazed master grating is formed by conducting sensitization, developing and ion beam etching on a convex blazed master grating substrate, and a working surface of the convex blazed master grating substrate (that is, the convex surface of the convex blazed master grating substrate) is an optical surface and has been polished; in a preparation process, a working surface of the convex blazed master grating substrate is coated with a photosensitive material, namely, photoresist, in a rotating manner; the convex blazed master grating substrate is first subjected to holographic exposure, to obtain a convex photoresist mask grating, then developing is conducted on the convex photoresist mask grating to obtain a photoresist master grating, and finally ion beam etching is conducted on the developed photoresist master grating to obtain the convex blazed master grating 1.

Figure 2:
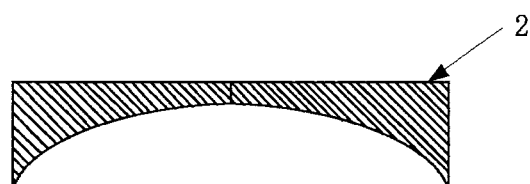
FIG. 2 is a schematic diagram of a concave grating replication substrate.

2. A concave grating substrate 2 is prepared, as shown in FIG. 2, where a surface type of a working surface (the working surface herein is opposite to the working surface explained above, and the two working surfaces are fit together in a replication process, which means that the working surface herein is the concave surface of the concave grating substrate and has a surface type consistent with that of the convex surface of the convex blazed master grating substrate) thereof is consistent with that of the working surface of the convex blazed master grating substrate. Moreover, the concave grating substrate can be divided into two blocks having an identical size and shape.

3. A segmentation sheet 4 is prepared. The segmentation sheet 4 can be used for segmentation. The segmentation sheet 4 cannot be bonded to a silicone oil coating separation layer, a reflection coating, or an epoxy resin glue. A material of the segmentation sheet is a hard high-temperature steaming PE sealing film, of which a main component is polyethylene. Segmentation is a main function of the segmentation sheet, and therefore, the segmentation sheet is very thin.

Figure 3:
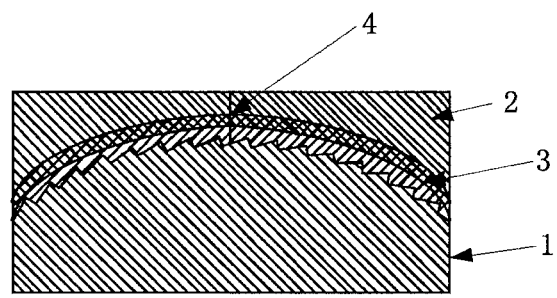
FIG. 3 is a schematic diagram of replicating a blazed concave grating by using convex blazed master grating.

4. A concave grating is replicated, as shown in FIG. 3. First, the segmentation sheet 4 is vertically placed in the middle of the convex blazed master grating 1 (the segmentation sheet 4 needs to be kept upright by means of an external force, for example a mechanical clamp; the segmentation sheet is clamped in a clamping groove adjustable in height, the clamping groove is symmetrically disposed at two sides of the grating, and the position of the clamping groove relative to the grating is adjusted, so that the segmentation sheet can be disposed right in the middle of the grating), the prepared convex blazed master grating 1 is first plated with a layer of a thin and uniform silicone oil coating that serves as a separation layer and then plated with a reflection coating (such as an aluminum coating, a gold coating or a silver coating), then the convex blazed master grating after evaporation is placed on a platform in a drying oven, epoxy resin is poured onto the convex blazed master grating, and the concave grating substrate 2 is pressed onto the master grating; after careful leveling and bubble removal, the drying oven is heated to 60 degrees, and after the epoxy resin is cured, the convex blazed master grating is taken out from the drying oven. In the entire process, the segmentation sheet always stands upright on the grating, in a process of placing the grating into the drying oven, because the segmentation sheet has a relatively small mass and is already kept upright, the clamping groove actually can be removed before the grating is placed into the drying oven. After the convex blazed master grating is taken out, the clamping groove may be disposed therein if necessary, to facilitate the pulling in the next step.

Figure 4:
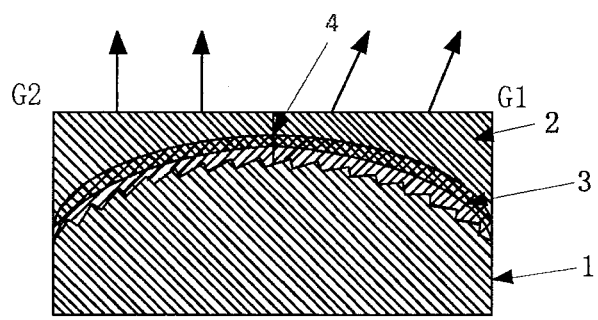
FIG. 4 is a schematic diagram of pulling a blazed concave grating.
Figure 5:
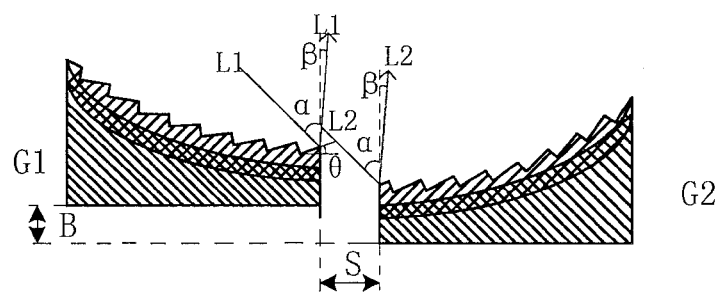
FIG. 5 is a schematic diagram of splicing blazed concave gratings.

5. The blazed concave gratings are separated, as shown in FIG. 4. The gratings, prepared but not separated yet, are separated. In a grating G2, a direct upward pulling manner is used, to obtain a good grating groove profile. If a grating G1 is pulled in the same manner, the groove profile at an edge part on the right side of the grating G1 is not ideal, thus decreasing the quality of the entire grating, decreasing the diffraction efficiency of the grating, and further affecting the application of the grating. The grating G1 is pulled at an inclined angle, which considers both sides of the grating, so that an ideal groove profile can be obtained. The separated gratings are as shown in FIG. 5. G1 and G2 are symmetric to each other in FIG. 2 (the substrate), but after the replication, G1 and G2 in FIG. 4 are asymmetric, where the asymmetry is reflected in micro groove profiles thereof. When ion beams are used for etching the convex blazed master grating substrate, angles of the ion beams are fixed, while the grating rotates in one direction, so that a final convex blazed master grating is obtained by means of etching. Therefore, the groove profiles of two sides of the convex master blazed grating are asymmetric, and the groove profiles of the blazed concave gratings are also asymmetric. Therefore, G1 and G2 are pulled in different manners.

6. The concave gratings are spliced, where a principle is as shown in FIG. 5. The separated gratings G1 and G2 are spliced according to the following principle: a spacing of B and a spacing of S exist between the gratings G1 and G2, a plane wave is incident onto the gratings G1 and G2 at an angle α, and if a light ray L1 and a light ray L2 need to be diffracted at an identical angle β, the gratings G1 and G2 need to have parallel surfaces and parallel grid lines. Assuming that the diffraction light ray L1 and the diffraction light ray L2 of a same diffraction level have a phase difference δ, the following calculation is conducted:

$$\delta = \frac{2\pi}{\lambda} \cdot [S \cdot (\sin\alpha + \sin\beta) - B \cdot (\cos\beta - \cos\alpha)]$$

In order to ensure the overall diffraction efficiency of the gratings, high phase precision is required for the concave gratings. In order to ensure the consistency of phases between diffraction wave surfaces of the gratings to be spliced in the spliced grating, not only are all gratings to be spliced required to be coplanar (that is, B is equal to 0), but also a value of the following formula is required to be an integer multiple of $2\pi$:

$$\delta = \frac{2\pi}{\lambda} \cdot S \cdot (\sin\alpha + \sin\beta) = \frac{2\pi}{\lambda} \cdot \Delta l$$

That is to say, not only B=0, but also S=Nd, that is, the spacing S is an integer multiple of a grating constant, where N is a positive integer, and d is a grating constant of the gratings to be spliced.

Therefore, the splicing and replication of the blazed concave gratings are completed.

For a person skilled in the art, various corresponding alterations and transformations can be made according to the technical solution and concept described above, and all such alterations and transformations shall fall within the protection scope of the claims of the present application.

What is claimed is:

1. A manufacture method for a blazed concave grating, comprising the following steps:

A, preparing a convex blazed master grating;

B, preparing a concave grating substrate, and preparing a segmentation sheet;

C, replicating a concave grating, wherein during replication, the segmentation sheet is vertically placed in the middle of the convex blazed master grating, so as to replicate two independent gratings on the convex blazed master grating;

D, separating blazed concave gratings: separately pulling the two independent gratings along two different directions, so as to separate the two independent gratings from the convex blazed master grating; and E, splicing the concave gratings: splicing the separated gratings.

2. The manufacture method for a blazed concave grating according to claim 1, wherein in step A, the convex blazed master grating is formed by conducting sensitization, developing and ion beam etching on a convex blazed master grating substrate, wherein a working surface of the convex blazed master grating substrate is an optical surface and has been polished; in a preparation process, a working surface of the convex blazed master grating substrate is coated with a photosensitive material, namely, photoresist, in a rotating manner; the convex blazed master grating substrate is first subjected to holographic exposure, to obtain a convex photoresist mask grating, then developing is conducted on the convex photoresist mask grating to obtain a photoresist master grating, and finally ion beam etching is conducted on the developed photoresist master grating to obtain the convex blazed master grating.

3. The manufacture method for a blazed concave grating according to claim 2, wherein a functional surface of the convex blazed master grating substrate is a plane, a spherical surface or an aspheric surface.

4. The manufacture method for the blazed concave grating as claimed in claim 2, wherein in step B, a surface type of the concave grating substrate is consistent with that of the working surface of the convex blazed master grating substrate, and the concave grating substrate can be divided into two blocks having an identical size and shape; a material of the segmentation sheet is a hard high-temperature steaming PE sealing film, of which a main component is polyethylene.

5. The manufacture method for a blazed concave grating according to claim 4, wherein the segmentation sheet cannot be bonded to a silicone oil coating separation layer, a reflection coating or an epoxy resin glue.

6. The manufacture method for a blazed concave grating according to claim 1, wherein in step C, first, the segmentation sheet is vertically placed in the middle of the convex blazed master grating; the prepared convex blazed master grating is first plated with a layer of a thin and uniform silicone oil coating that serves as a separation layer and then plated with a reflection coating, then the convex blazed master grating after evaporation is placed on a platform in a drying oven, epoxy resin is poured onto the convex blazed master grating, the concave grating substrate is pressed onto the master grating; after leveling and bubble removal, the drying oven is heated to a suitable curing temperature, and after the epoxy resin is cured, the convex blazed master grating is taken out from the drying oven.

7. The manufacture method for a blazed concave grating according to claim 1, wherein in step E, the two gratings have a spacing of B=0 in the vertical direction, the two gratings have a spacing of S=Nd in the horizontal direction, that is, S is an integer multiple of a grating constant, wherein N is a positive integer, and d is a grating constant of a grating to be spliced.

* * * * *